May 12, 1959 W. L. HEARD 2,886,351
ELEMENTS FOR LABYRINTH SEALS
Filed Jan. 3, 1956 2 Sheets-Sheet 1
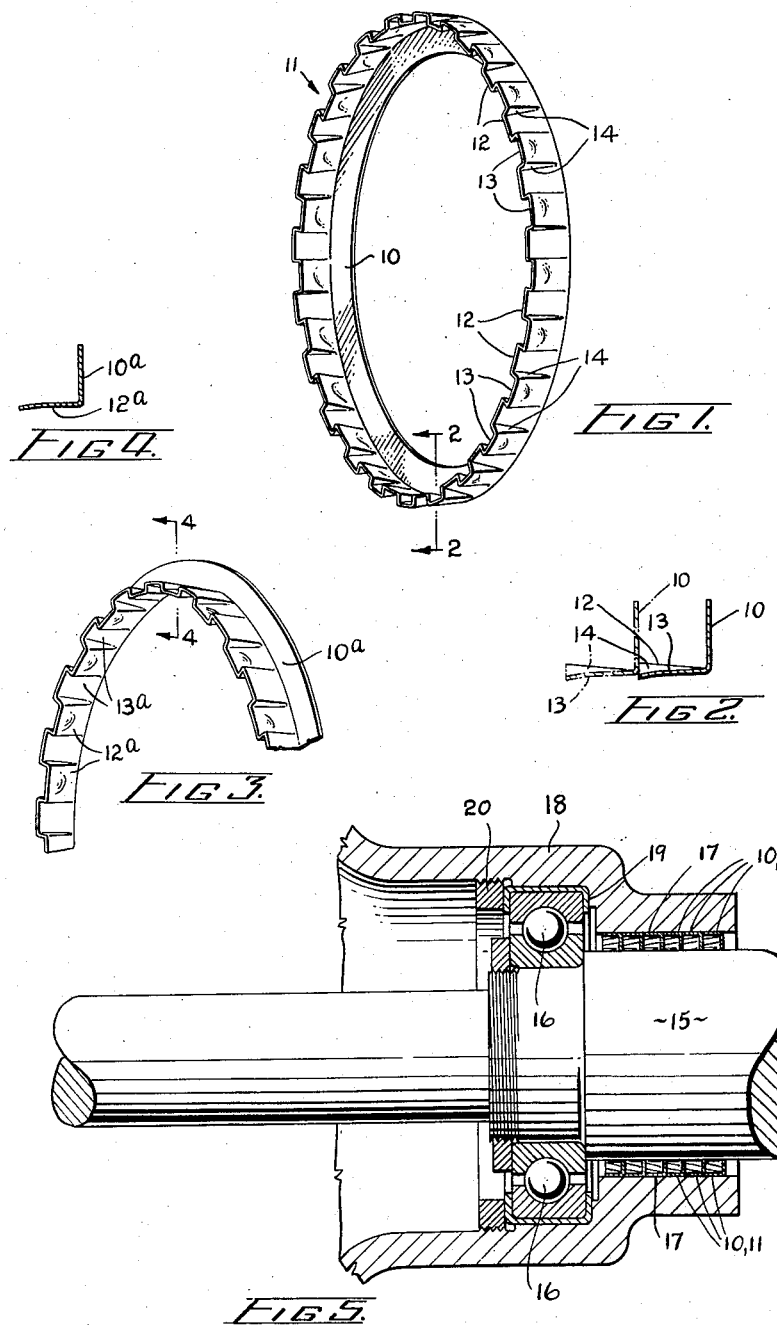
INVENTOR
WILLIAM L. HEARD
BY
Maybee & Legris
ATTORNEYS.

May 12, 1959 W. L. HEARD 2,886,351
ELEMENTS FOR LABYRINTH SEALS
Filed Jan. 3, 1956 2 Sheets-Sheet 2

INVENTOR
WILLIAM L. HEARD
BY
Maybee & Legris
ATTORNEYS.

United States Patent Office 2,886,351
Patented May 12, 1959

2,886,351
ELEMENTS FOR LABYRINTH SEALS
William Lane Heard, Milton, Ontario, Canada, assignor to Orenda Engines Limited, Malton, Ontario, Canada
Application January 3, 1956, Serial No. 556,919
8 Claims. (Cl. 286—10)

This invention relates to a labyrinth seal, and is particularly concerned with a labyrinth seal element which is to be engaged in a bore of one structural member forming part of the seal for co-action with a shaft forming another structural member of the seal or, conversely, engaged on the said shaft for co-action with the wall of the said bore.

It has previously been proposed to form a labyrinth seal from a plurality of annular labyrinth seal elements which are held spaced and accurately aligned in a bore or on a shaft by interposed spacers. In such constructions the sealing elements and spacers are embedded in grooves, or they are a press fit in the bore or on the shaft and are brazed in position to form an integral unit. The assembly of the seal elements and spacers in or on the associated structural part is a very delicate and tedious operation involving the use of highly skilled labour and expensive jigs. Also, difficulty has been experienced in satisfactorily brazing the assembly due to the fact that the seal elements and spacers have to be held in their correct position by jigs when the brazing operation is being carried out.

One object of this invention is to provide an element for a labyrinth seal which is simple and inexpensive to manufacture, and which can be assembled on to a supporting component using simple and inexpensive jigs.

Another object is to provide a labyrinth seal element which has a form or configuration rendering the use of jigs unnecessary for holding the element in position while the brazing operation is being carried out.

A further object is to provide a labyrinth seal element which is self-supporting in an appropriate bore or on a shaft of appropriate diameter.

A still further object is to provide a labyrinth seal element having an integral spacer.

A still further object is to provide a labyrinth seal which is of reduced weight as compared with the previously proposed constructions.

According to one feature of the invention, an element for a labyrinth seal comprises an annulus for co-action at one of its peripheries with a structural member forming part of the labyrinth seal, and means integral with the said annulus for engagement with another structural member of the labyrinth seal, the said means extending from the other periphery of the said annulus in a direction substantially parallel to the axis of the said annulus to provide an abutment for a further labyrinth seal element to be engaged with said other structural member.

According to a further feature of the invention, a labyrinth seal comprises in combination a first structural member having a bore, a second structural member movable relatively to said first member within said bore, and a plurality of sealing elements positioned in said bore between said members, each of said elements including an annulus for co-action at one of its peripheries with one of said structural members and means integral with said annulus and for engagement with the other structural member, said means extending from the other periphery of said annulus in a direction substantially parallel to the axis of said annulus to provide an abutment for a further labyrinth seal element engaged with said other structural member.

The foregoing and still further objects and advantages of the invention will become apparent from a study of the following specification, taken in conjunction with the accompanying drawings, in which like reference characters indicate corresponding parts throughout the several views, and in which:

Figure 1 is a perspective view of a labyrinth seal element according to the invention, the labyrinth seal element being of preferred construction and for the engagement in a bore for co-action with a shaft;

Figure 2 is a section on the line 2—2 of Figure 1;

Figure 3 is a fragmentary perspective view of a modification of the labyrinth seal element shown in Figure 1, and is for use where the element is to be engaged with a shaft for co-action with a bore;

Figure 4 is a section on the line 4—4 of Figure 3;

Figure 5 is a fragmentary sectional elevation showing a labyrinth seal constructed according to the invention, the drawing showing a plurality of labyrinth seal elements according to Figure 1 in position in a bore and co-acting with a shaft;

Figure 6:
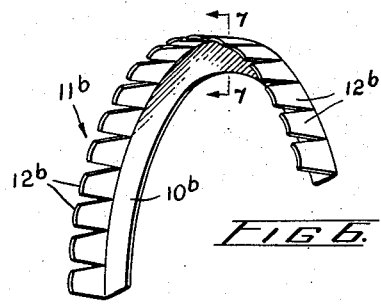
Figure 6 is a fragmentary perspective view of another embodiment of the labyrinth seal element of the invention, the element being for engagement in a bore and co-action with a shaft.

Referring to Figures 1 and 2, the labyrinth seal element is formed as a stamping or pressing from thin sheet metal, for example, stainless steel, and includes an annulus 10, the internal periphery of which is to co-act with the periphery of a shaft, and a flange indicated by the arrow 11. The flange, as will be seen from the drawings, is formed by fingers 12 and 13 which are integral with the annulus at its outer periphery, and by webs 14 which extend between the fingers to form a continuous peripherally undulated flange.

Figure 5 shows by way of example two structural members in one of which a plurality of the labyrinth seal elements shown in Figure 1 are engaged.

One of the structural members is a shaft 15 which is mounted in bearings 16 for rotation co-axially within a bore 17 of the other structural member 18. As will be seen, the bearing 16 abuts a shoulder 19 of the structural member 18 and is held in position by an externally threaded ring 20. The labyrinth seal elements 10, 11 are engaged in the bore 17 for the inner periphery of their annulus 10 to co-act with the periphery of the shaft 15.

For assembling the seal, the structural member 18 (without the shaft 15 and bearings 16) has a plug (not shown) inserted in the right-hand end of its bore 17 to form an end stop and abutment and a labyrinth seal element 10, 11 is forced into the left-hand end of the bore, with the face of the annulus remote from the flange presented towards the plug. For this purpose use is made of a tool, for example, a simple plunger, which moves the element along the bore until the above mentioned face of the annulus contacts the plug.

The pitch circle of the fingers 13 of each of the labyrinth seal elements is of greater diameter than the bore 17, and the diameter of the outer periphery of the annulus 10 is substantially the same as that of the bore 17, so that when the element is forced into the bore the fingers 13 are forced radially inwardly. Thus, owing to the resiliency of the metal from which the labyrinth seal element is formed, and the inherent resilience engendered by the particular form of the flange 11, which "concertinas" when the element is forced into the bore, the element is supported in the bore 17 in a very stable manner by the frictional engagement of the fingers 13 with the wall of the bore.

The element is moved by the plunger up to the face of the plug, which provides axial location for the element and also ensures that the annulus 10 is in a truly radial plane, and a further labyrinth seal element is then positioned in the bore in exactly the same manner, the undulations in the face edge of the flange 11 of the previously inserted labyrinth seal element providing an abutment for axially locating the annulus 10 of the subsequently inserted element, as is indicated in Figure 2. This procedure repeated until the requisite number of elements have been positioned in the bore, after which the plug is removed, and the assembled series of labyrinth seal elements are brazed to the inner wall of the bore. It is unnecessary to support the labyrinth seal elements during the brazing operation, as the resiliency of the flanges 11 holds them accurately in position. Also, the undulations in the flanges 11 provide reservoirs in which the brazing metal is held by capillary action and/or by surface tension of the molten metal, thus forming a most efficient brazed joint between the elements and the wall of the bore. If desired, the pockets formed by the undulations can be packed with a suitable flux and powdered brazing metal before the seals are inserted into the bores.

In some cases it may be desired to position the labyrinth seal element on the shaft, so that the external periphery of the annulus co-acts with the wall of the bore. Such an element is shown in Figures 3 and 4, where the fingers 12a, 13a are integral with the inner periphery of the annulus 10a. In this case the dedendum circle of the fingers 12a is of smaller diameter than the inner periphery of the annulus 10a and of the shaft, so that when the labyrinth seal element is engaged on the shaft the fingers 12a will resiliently grip the shaft to locate the element prior to the brazing operation. The series of elements is assembled and brazed as previously described.

Although the labyrinth seal elements above described are of the preferred construction according to the invention, various modifications may be made without departing from the spirit of the invention. The essential features of the invention are that the flange shall resiliently engage the supporting member to locate the labyrinth seal element, and that the free edge of the flange shall provide an abutment for a subsequent element to be engaged with the supporting member.

Figures 6 to 13 show various modifications of the labyrinth seal element according to the invention, and are given by way of example and are not to be considered exhaustive of the various forms, or combinations of forms the flange may take.

Figure 7:
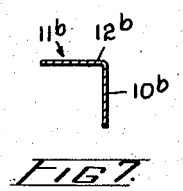
Figure 7 is a section on the line 7—7 of Figure 6.

In Figures 6 and 7, the flange 11b is formed by a plurality of fingers 12b which are arranged in a series integral with the outer periphery of the annulus 10b. Each of the fingers 12b is bowed in an axial direction to increase their resiliency and to provide an abutment as mentioned hereinabove.

Figure 8:
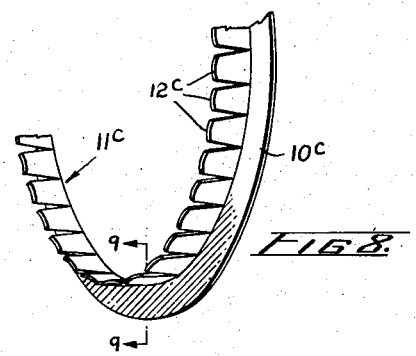
Figure 8 is a fragmentary perspective view of an embodiment of the invention similar to Figure 6, but showing a labyrinth seal element constructed for engagement with a shaft and for co-action with the wall of a bore.
Figure 9:
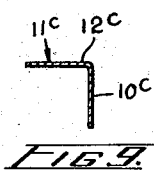
Figure 9 is a section on the line 9—9 of Figure 8.

Figures 8 and 9 show a modification of Figures 6 and 7, the labyrinth seal element of Figures 8 and 9 being for engagement with a shaft, the flange 11c being formed by fingers 12c which are integral with the inner periphery of the annulus 10c and which are bowed as in Figures 6 and 7.

Figure 10:
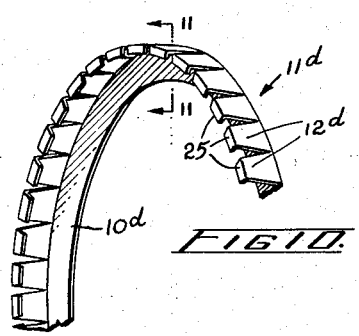
Figure 10 is a fragmentary perspective view of a further embodiment of the labyrinth seal element of the invention, the element being for engagment in a bore and co-action with a shaft.
Figure 11:
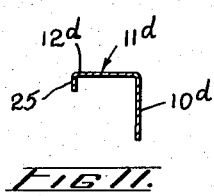
Figure 11 is a section on the line 11—11 of Figure 10.

Figures 10 and 11 show a further modification, in which the flange 11d is formed by fingers 12d which are arranged in a peripheral series integral with the annulus 10d at its outer periphery, and which have turned inwardly at their extremities remote from the annulus 10d to provide abutment surfaces 25.

Figure 12:
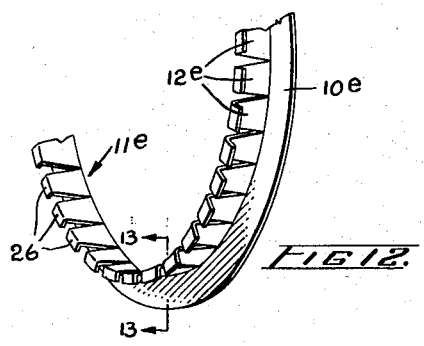
Figure 12 is a fragmentary perspective view of an embodiment of the invention similar to Figure 10, but showing a labyrinth seal element constructed for engagement with a shaft and for co-action with the wall of a bore.
Figure 13:
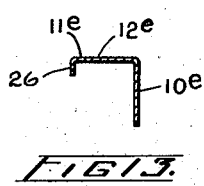
Figure 13 is a section on the line 13—13 of Figure 12.

Figures 12 and 13 show a labyrinth seal element according to the modifications of Figures 10 and 11 which is to be positioned on a shaft, the flange 11e being formed of fingers 12e having outwardly turned extensions 26, the fingers 12e being integral with the annulus 10e at its inner periphery.

In the constructions of Figures 1, 6 and 10 above described the flanges 11, 11b, 11d are of greater diameter at their edge remote from the annulus than they are at their edges integral with the annulus, so that the fingers can resiliently engage the wall of an appropriate bore when the labyrinth seal is assembled. Conversely, the edges of the flanges 11a, 11c, 11d remote from the annulus are arranged on a circle of smaller diameter than the inner periphery of the annulus so that the fingers will resiliently engage the periphery of a shaft with which they are engaged.

It will be seen that by the invention a labyrinth seal is provided which is of simple construction, which is light in weight, and which, by virtue of its integral flange, avoids the weight penalty imposed by the use of separate spacers. Also, the labyrinth seal element is of a form which is particularly adapted for brazing to an appropriate supporting structural member, and is self supporting in or on an appropriate structural member while the brazing operation is being carried out.

What I claim as my invention is:

1. An element for a labyrinth seal, comprising a continuous, imperforate annulus for coaction at one of its peripheries wtih one structural member forming part of a labyrinth seal and adapted to be engaged at its other periphery with another structural member of the labyrinth seal, circumferentially-spaced fingers formed integrally with said annulus at its said other periphery and extending from a radial face thereof in a direction substantially parallel to but at a small angle to the axis of the annulus for the fingers to extend away from said one structural member and whereby the fingers may resiliently engage the said another structural member, each finger being formed at its free end to provide an abutment, of materially greater extent measured in a direction radially of the annulus than the thickness of the material from which the finger is formed, for a further labyrinth seal element to be mounted on the said another structural member.

2. An element for a labyrinth seal, comprising a continuous, imperforate annulus for coaction at one of its peripheries with one structural member forming part of a labyrinth seal and adapted to be engaged at its other periphery with another structural member of the labyrinth seal, a first series of circumferentially-spaced fingers formed integrally with said annulus at its said other periphery and extending from a radial face thereof in a direction substantially parallel to but at a small angle to the axis of the annulus for the fingers to extend away from said one structural member and whereby the fingers may resiliently engage the said another structural member, a second series of circumferentially-spaced fingers integral with said annulus at its said other periphery and extending from said radial face thereof, each finger of the second series being positioned between two fingers of the first series and extending towards said one structural member for the fingers of the second series to define a small angle with the adjacent fingers of the first series, and webs forming a transition between adjacent ones of the fingers to provide a continuous peripherally undulated flange, the free edge of the flange constituting an abutment, of materially greater extent measured in a direction radially of the annulus than the thickness of the material from which the flange is formed, for a further labyrinth seal element to be mounted on the said another structural member.

3. An element for a labyrinth seal, comprising a continuous, imperforate annulus for coaction at one of its peripheries with one structural member forming part of a labyrinth seal and adapted to be engaged at its other periphery with another structural member of the labyrinth seal, circumferentially-spaced fingers formed integrally with said annulus at its said other periphery and extending from a radial face thereof in a direction substantially parallel to but at a small angle to the axis of the annulus for the fingers to extend away from said one structural member and whereby the fingers may resiliently engage the said another structural member, each finger being bowed in a direction transversely of the finger for the free end of the finger to constitute an abutment, of materially greater extent measured in a direction radially of the annulus than the thickness of the material from which the finger is formed, for a further labyrinth seal element to be mounted on the said another structural member.

4. An element for a labyrinth seal, comprising a continuous, imperforate annulus for coaction at one of its peripheries with one structural member forming part of a labyrinth seal and adapted to be engaged at its other periphery with another structural member of the labyrinth seal, circumferentially-spaced fingers formed integrally with said annulus at its said other periphery and extending from a radial face thereof in a direction substantially parallel to but at a small angle to the axis of the annulus for the fingers to extend away from said one structural member and whereby the fingers may resiliently engage the said another structural member, each finger being bent at its free end to provide a discontinuous flange lying in a plane substantially parallel to the said radial face and directed towards said one structural member for the free ends of the fingers to constitute an abutment, of materially greater extent measured in a direction radially of the annulus than the thickness of the material from which the finger is formed, for a further labyrinth seal element to be mounted on the said another structural member.

5. A labyrinth seal, comprising in combination a first structural member having a bore, a second structural member movable relative to the first member within said bore, and a plurality of labyrinth seal elements positioned in said bore between said members, each of said elements including a continuous, imperforate annulus for coacting at one of its peripheries with one of the structural members and adapted to be engaged at its other periphery with the other structural member, circumferentially-spaced fingers formed integrally with said annulus at its said other periphery and extending from a radial face thereof in a direction substantially parallel to but at a small angle to the axis of the annulus for the fingers to extend away from said one structural member and whereby the fingers may resiliently engage said other structural member, each finger being formed at its free end to provide an abutment, of materially greater extent measured in a direction radially of the annulus than the thickness of the material from which the finger is formed, for a further labyrinth seal element to be mounted on the said other structural member.

6. A labyrinth seal, comprising in combination a first structural member having a bore, a second structural member movable relative to said first member within said bore, and a plurality of labyrinth seal element positioned within said bore between said members, each of said elements including a continuous, imperforate annulus for coaction at one of its peripheries with one of the structural members and adapted to be engaged at its other periphery with the other structural member, a first series of circumferentially-spaced fingers formed integrally with said annulus at its said other periphery and extending from a radial face thereof in a direction substantially parallel to but at a small angle to the axis of the annulus for the fingers to extend away from said one structural member and whereby the fingers may resiliently engage said other structural member, a second series of circumferentially-spaced fingers integral with said annulus at its other periphery and extending from said radial face thereof, each finger of the second series being positioned between two fingers of the first series and extending towards said one structural member for the fingers of the second series to define a small angle with the adjacent fingers of the first series, and webs forming a transition between adjacent ones of the fingers to provide a continuous peripherally undulated flange, the free edge of the flange constituting an abutment, of greater extent measured in a direction radially of the annulus than the thickness of the material from which the flange is formed, for a further labyrinth seal element to be mounted on the said another structural member.

7. A labyrinth seal, comprising in combination a first structural member having a bore, a second structural member movable relative to said first member within said bore, and a plurality of labyrinth seal elements positioned within said bore between said members, each of said elements including a continuous, imperforate annulus for coaction at one of its peripheries with one of the structural members and adapted to be engaged at its outer periphery with the other structural member, circumferentially-spaced fingers formed integrally with said annulus at its said other periphery and extending from a radial face thereof in a direction substantially parallel to but at a small angle to the axis of the annulus for the fingers to extend away from said one structural member and whereby the fingers may resiliently engage said other structural member, each finger being bowed in a direction transversely of the finger for the free end of the finger to constitute an abutment, of materially greater extent measured in a direction radially of the annulus than the thickness of the material from which the finger is formed, for a further labyrinth seal element to be mounted on the said other structural member.

8. A labyrinth seal, comprising in combination a first structural member having a bore, a second structural member movable relative to said first member within said bore, and a plurality of labyrinth seal elements positioned within said bore between said members, each of said elements including a continuous, imperforate annulus for coaction at one of its peripheries with one of the structural members and adapted to be engaged at its outer periphery with the other structural member, circumferentially-spaced fingers formed integrally with said annulus at its said other periphery and extending from a radial face thereof in a direction substantially parallel to but at a small angle to the axis of the annulus for the fingers to extend away from said one structural member and whereby the fingers may resiliently engage said other structural member, each finger being bent at its free end to provide a discontinuous flange lying in a plane substantially parallel to the said radial face and directed towards said one structural member for the free end of the finger to constitute an abutment, of materially greater extent measured in a direction radially of the annulus than the thickness of the material from which the finger is formed, for a further labyrinth seal element to be mounted on the said other structural member.

References Cited in the file of this patent

UNITED STATES PATENTS

| Number | Name | Date |
| --- | --- | --- |
| 907,808 | Jebsen | Dec. 29, 1908 |
| 1,641,749 | Enders | Sept. 6, 1927 |
| 1,817,776 | Sipe | Aug. 4, 1931 |

FOREIGN PATENTS

| Number | Country | Date |
| --- | --- | --- |
| 92,994 | Austria | June 11, 1923 |
| 506,868 | Canada | Oct. 26, 1954 |
| 566,812 | Great Britain | Jan. 16, 1945 |